United States Patent
Zangi

(10) Patent No.: US 8,666,333 B2
(45) Date of Patent: Mar. 4, 2014

(54) USING ANTENNA ARRAYS TO PRODUCE OMNI-DIRECTIONAL TRANSMISSIONS

(75) Inventor: Kambiz Zangi, Chapel Hill, NC (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 595 days.

(21) Appl. No.: 11/275,111

(22) Filed: Dec. 12, 2005

(65) Prior Publication Data

US 2007/0135063 A1 Jun. 14, 2007

(51) Int. Cl.
*H04B 1/02* (2006.01)
(52) U.S. Cl.
USPC ............ 455/101; 455/63.4; 455/69; 455/121; 455/63.1
(58) Field of Classification Search
USPC ........... 455/63.4, 13.3, 25, 69, 121, 522, 501, 455/63.1, 101, 91, 575.7
See application file for complete search history.

(56) References Cited

U.S. PATENT DOCUMENTS

| | | | | |
|---|---|---|---|---|
| 5,481,570 A | * | 1/1996 | Winters | 375/347 |
| 5,543,806 A | * | 8/1996 | Wilkinson | 342/368 |
| 5,629,707 A | * | 5/1997 | Heuvel et al. | 342/357.16 |
| 6,006,113 A | * | 12/1999 | Meredith | 455/561 |
| 6,232,921 B1 | * | 5/2001 | Aiken et al. | 342/383 |
| 6,556,845 B1 | | 4/2003 | Ide et al. | |
| 2004/0038702 A1 | * | 2/2004 | Okawa et al. | 455/522 |
| 2004/0185783 A1 | * | 9/2004 | Okawa et al. | 455/63.4 |

FOREIGN PATENT DOCUMENTS

| | | |
|---|---|---|
| CN | 2730033 Y | 9/2005 |
| EP | 0917383 | 5/1999 |

* cited by examiner

*Primary Examiner* — Tuan Pham

(57) ABSTRACT

Diversity arrays of antenna elements and phased arrays of antenna elements can be used to produce omni-directional transmissions. Communication signaling is produced based on a desired communication signal that is to be transmitted omni-directionally. In response to the communication signaling, the antenna elements cooperate to effect approximately omni-directional antenna transmission of the desired communication signal.

5 Claims, 2 Drawing Sheets

USING ANTENNA ARRAYS TO PRODUCE OMNI-DIRECTIONAL TRANSMISSIONS

FIELD OF THE INVENTION

The invention relates generally to wireless communications and, more particularly, to antenna transmissions.

BACKGROUND OF THE INVENTION

A conventional cellular access point (or base station) that employs beamforming techniques typically includes a phased-array antenna structure that is used to transmit on the downlink in various directions. Besides the information that is transmitted directionally, the access point often needs to transmit some other information omni-directionally. Broadcast services and basic control information about the cell are examples of information that needs to be transmitted omni-directionally. Because each antenna element of the array is itself an omni-directional antenna, omni-directional transmission can be achieved by operating a selected antenna element of the array at a higher transmission power than the other antenna elements of the array. However, this approach presents complications. For example, as a practical matter, the antenna element that is used for omni-directional transmission will need to have associated therewith a power amplifier arrangement that can support a higher transmit power than the power amplifiers associated with those antenna elements that are not used for omni-directional transmission. This complicates factors such as the design and placement of the power amplifiers used in the access point.

It is therefore desirable to provide for omni-directional transmission from an array of antenna elements without the aforementioned difficulties.

SUMMARY OF THE INVENTION

According to various exemplary embodiments of the invention, both diversity arrays and phased arrays of antenna elements can be used to produce omni-directional transmissions. Communication signaling is produced based on a desired communication signal that is to be transmitted omni-directionally. In response to the communication signaling, the antenna elements cooperate to effect approximately omni-directional antenna transmission of the desired communication signal.

DETAILED DESCRIPTION

Figure 1:
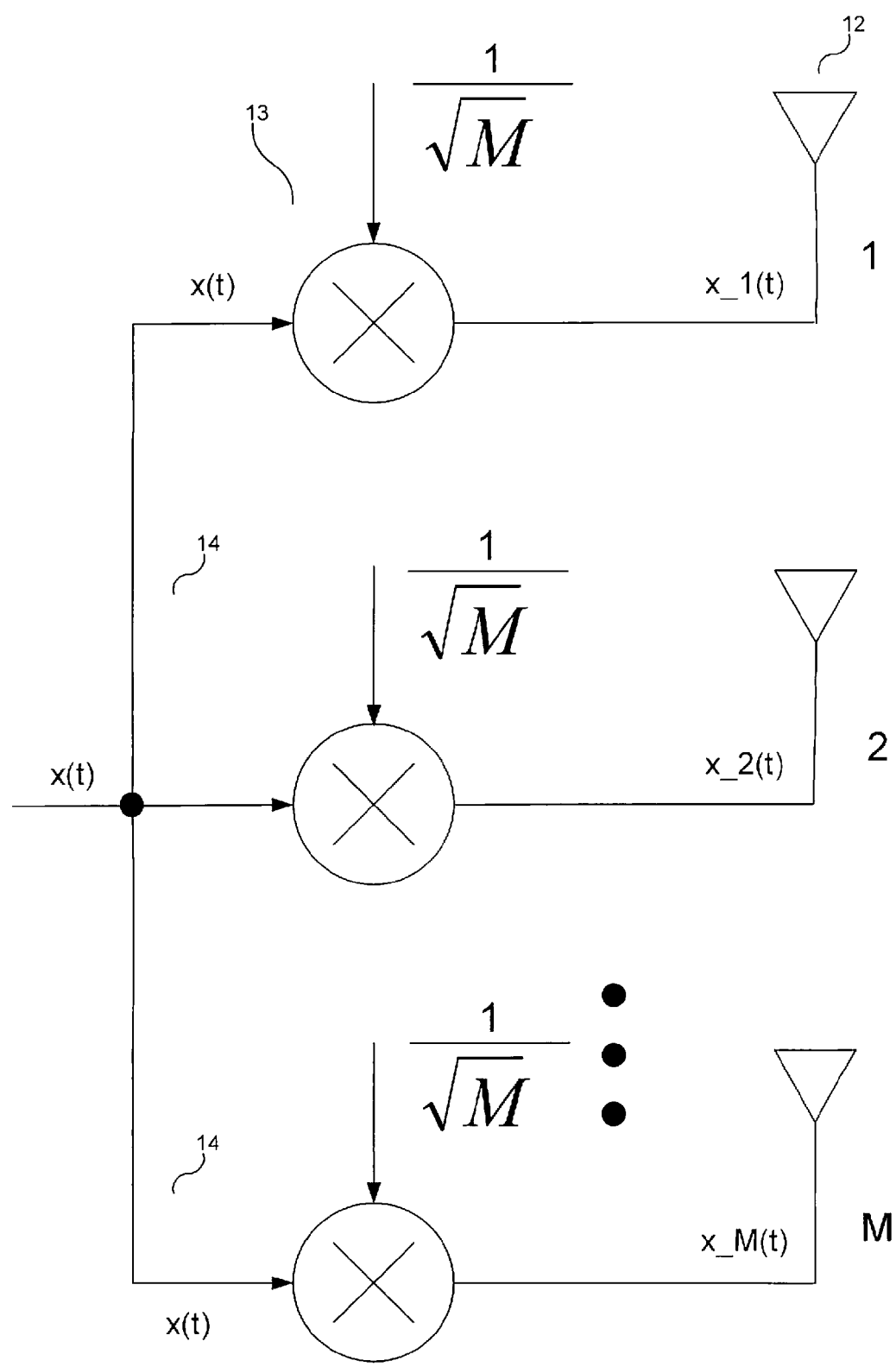
FIG. 1 illustrates a wireless communication apparatus according to exemplary embodiments of the invention.

Exemplary embodiments of the invention provide for omni-directional transmissions from an apparatus that uses a phased-array of antenna elements, or from an apparatus that uses an array of diversity antenna elements. The total transmitted power can be shared equally among all the antenna elements, while still achieving the desired omni-directional transmission. There is no need for a separate high power amplifier dedicated to omni-directional transmissions.

Consider the case of a wireless communication apparatus that uses an array of diversity antenna elements, that is, an array wherein the antenna elements are located far enough apart from one another for their respective transmission channels to be uncorrelated with one another. Assume, for purposes of illustration only, an example with M diversity antenna elements that are all to be used for omni-directional transmission of a signal $X(w)$ to various receiver devices (e.g., mobile stations) surrounding the array of antenna elements. That is, the antenna elements should be used to transmit the signal $X(w)$ to each receiver in such a way that the resulting channel is similar to the channel that would be obtained if an omni-directional transmit antenna were used. More specifically, the channel seen by each receiver should have the same statistics, regardless of the angular positioning of the receiver relative to the array.

The channel from the m-th diversity antenna element to a given receiver is denoted by $G_m(w)$, which is assumed for this example to be a complex Gaussian random variable with a mean of zero and a variance of one. In a diversity array, the channels from different antenna elements of the array are independent, that is, $$E(G_i(w_1)G_j^*(w_2)) = \delta_{i,j} K_G(w_1, w_2), \quad (1)$$

where $$K_G(w_1, w_2) = E\{G_i(w_1)G_i^*(w_2)\} \text{ and} \quad (2)$$

$$\delta_{i,j} = \begin{cases} 1 & \text{for } i = j \\ 0 & \text{otherwise} \end{cases}$$

In general, it can be assumed that $K_G(w_1,w_2)=0$ if $|w_2-w_1|>\Delta$, where $\Delta$ is the coherence bandwidth of $G_i(w_1)$. Suppose that a signal $$\frac{1}{\sqrt{M}} X(w)$$

is fed to each of the M diversity antenna elements. This is equivalently represented in the time domain as $$\frac{1}{\sqrt{M}} x(t).$$

If this signal is fed to each antenna element of the diversity array for transmission, then the signal $R(w)$ received at the receiver will be $$R(w) = \left( \frac{1}{\sqrt{M}} \sum_{i=1}^{M} G_i(w) \right) X(w) \quad (3)$$

The effective channel $Q(w)$ between $X(w)$ and $R(w)$ is given by the expression inside the large parentheses in Equation 3. Because $Q(w)$ is the sum of M independent Gaussian random variables with mean zero and variance one, $Q(w)$ is also Gaussian, with a mean of zeros and a variance of one.

The correlation function for channel $Q(w)$ is:

$$K_Q(w_1, w_2) = E\{Q(w_1)Q*(w_2)\} \quad (4)$$

$$= E\left\{\frac{1}{M}\sum_{i=1}^{M}\sum_{k=1}^{M}G_i(w_1)G_k(w_2)\right\} \quad (5)$$

$$= \frac{1}{M}\sum_{i=1}^{M}K_G(w_1, w_2) \quad (6)$$

$$= K_G(w_1, w_2) \quad (7)$$

Equation 7 indicates that the effective channel Q(w) has exactly the same statistics as any of the M individual channels $G_m(w)$ originally assumed above. The power transmitted from any of the antenna elements is $$\frac{1}{M}th$$

of the total power transmitted from all of the antenna elements.

FIG. 1 diagrammatically illustrates a wireless communication apparatus that can implement principles illustrated by Equations 3-7 according to exemplary embodiments of the invention. In some embodiments, the apparatus of FIG. 1 is a cellular access point or base station. The access point of FIG. 1 includes an array of M diversity antenna elements designated generally at 12, and a drive arrangement designated generally at 13 that provides communication signaling to the antenna array 12. A signal x(t) that is to be transmitted omni-directionally is input to each of M antenna transmission paths designated generally at 14 within the drive apparatus 13. The antenna transmission paths drive respectively corresponding ones of the M diversity antenna elements. As shown, each antenna transmission path includes a signal combiner (e.g., a multiplier or amplifier) that combines (e.g., multiplies) the signal x(t) with $$\frac{1}{\sqrt{M}}$$

to produce an associated transmit signal, x_1(t), x_2(t), ... x_M(t), that is transmitted by the corresponding antenna element. All of the transmit signals are thus $$\frac{1}{\sqrt{M}}x(t).$$

The apparatus of FIG. 1 implements principles of Equations 3-7, and achieves approximately omni-directional transmission of the desired signal x(t), which is a time domain representation of the above-described frequency domain signal X(w).

Consider now the case of a wireless communication apparatus that uses a phased array of antenna elements wherein the antenna elements are physically separated from one another by only a small fraction of the wavelength at the transmission carrier frequency. This spacing facilitates beamforming and other transmission techniques that rely on suitably controlling the phases of the respective signals transmitted from the respective antenna elements. Assume, for purposes of illustration only, an example with M phased array antenna elements that are all to be used to achieve omni-directional transmission of a signal X(w) to various receiver devices (e.g., mobile stations) surrounding the array of antenna elements. That is, the antenna elements should be used to transmit the signal X(w) to each receiver in such a way that the resulting channel is similar to the channel that would be obtained if an omni-directional transmit antenna were used. More specifically, the channel seen by each receiver should have the same statistics, regardless of the angular positioning of the receiver relative to the array.

As indicated above, the distance between antenna elements in a phased array apparatus is much smaller than the wavelength at the transmission carrier frequency. This means that the channels between each antenna element and the receiver only differ by a constant (frequency independent) multiplicative phase factor, i.e., the phase shift at the carrier frequency corresponding to the time it would take the radio waves to propagate the distance between two antenna elements. The channel $G_m(w)$ between the m-th antenna element (for m=1, 2, . . . M) and the receiver can be expressed as:

$$G_m(w) = G_0(w)\exp\left(j\frac{2\pi dm}{\lambda}\cos\phi\right) \quad (8)$$

where d is the spacing between the antenna elements (assumed to be much smaller than the wavelength at the carrier frequency), λ is the wavelength at the carrier frequency, and φ is the direction of the receiver relative to the normal to the array. Assume for this illustrative example that $G_0(w)$ is a complex Gaussian variable with a mean of zero and a variance of one.

Suppose that a signal $$X_i(w) = \frac{1}{\sqrt{M}}H_i(w)X(w)$$

is fed to the i-th transmit antenna element (for i=1, 2, . . . M), where $H_i(w)$ is a complex Gaussian random variable with a mean of zero and a variance of one. Assume also for this example that for i≠j, $H_i(w)$ and $H_j(w)$ are independent but identically distributed random processes, so that $$E\{H_i(w_1)H_j^*(w_2)\}=\delta_{i,j}K_H(w_1,w_2) \quad (9)$$

The received signal R(w) at the receiver is $$R(w) = \frac{1}{\sqrt{M}}\sum_{i=1}^{M}H_i(w)G_i(w)X(w) \quad (10)$$

$$= \frac{1}{\sqrt{M}}\sum_{i=1}^{M}H_i(w)\exp\left(j\frac{2\pi di}{\lambda}\cos\phi\right)G_0(w)X(w). \quad (11)$$

Let $$\alpha(w) = \frac{1}{\sqrt{M}}\sum_{i=1}^{M}H_i(w)\exp\left(j\frac{2\pi di}{\lambda}\cos\phi\right). \quad (12)$$

and note initially that the mean of α(w) is zero. The correlation of α(w) is:

$$K_\alpha(w_1, w_2) = E\{\alpha(w_1)\alpha(w_2)^*\} \quad (13)$$

$$= E\left\{\frac{1}{M}\sum_{i=1}^{M}\sum_{k=1}^{M} H_i(w_1)\exp\left(j\frac{2\pi i}{\lambda}\cos\phi\right)H_k^*(w_2)\exp\left(-j\frac{2\pi k}{\lambda}\cos\phi\right)\right\} \quad (14)$$

$$= \frac{1}{M}\sum_{i=1}^{M} K_H(w_1, w_2) \quad (15)$$

$$= K_H(w_1, w_2) \quad (16)$$

The effective channel between X(w) and R(w) is Q(w)=G₀(w)α(w). The correlation function for this effective channel Q(w) is:

$$K_Q(w_1, w_2) = E\{Q(w_1)Q^*(w_2)\} \quad (17)$$
$$= E\{G_0(w_1)\alpha(w_1)G_0^*(w_2)\alpha^*(w_2)\} \quad (18)$$
$$= E\{G_0(w_1)G^*(w_2)\}E\{\alpha(w_1)\alpha^*(w_2)\} \quad (19)$$
$$= K_G(w_1, w_2)K_H(w_1, w_2) \quad (20)$$

If $K_H(w_1, w_2)$ is chosen to satisfy $$K_H(w_1, w_2) = \begin{cases} 1 & |w_2 - w_1| < \Delta \\ 0 & \text{otherwise} \end{cases} \quad (21)$$

where Δ is the coherence bandwidth of the original channel as defined by Equation 2 above, then the effective channel between X(w) and the receiver will have the same second-order statistics as an omni-directional channel G₀(w), that is, $$K_Q(w_1, w_2) \approx K_G(w_1, w_2) \quad (22)$$

Equation 22 implies that the channel between X(w) and the receiver is independent of the angular position of the receiver, and has exactly the same second-order statistics as G₀(w). The power transmitted from any of the antenna elements is $$\frac{1}{M}th$$

of the total power transmitted from all of the antenna elements.

Figure 2:
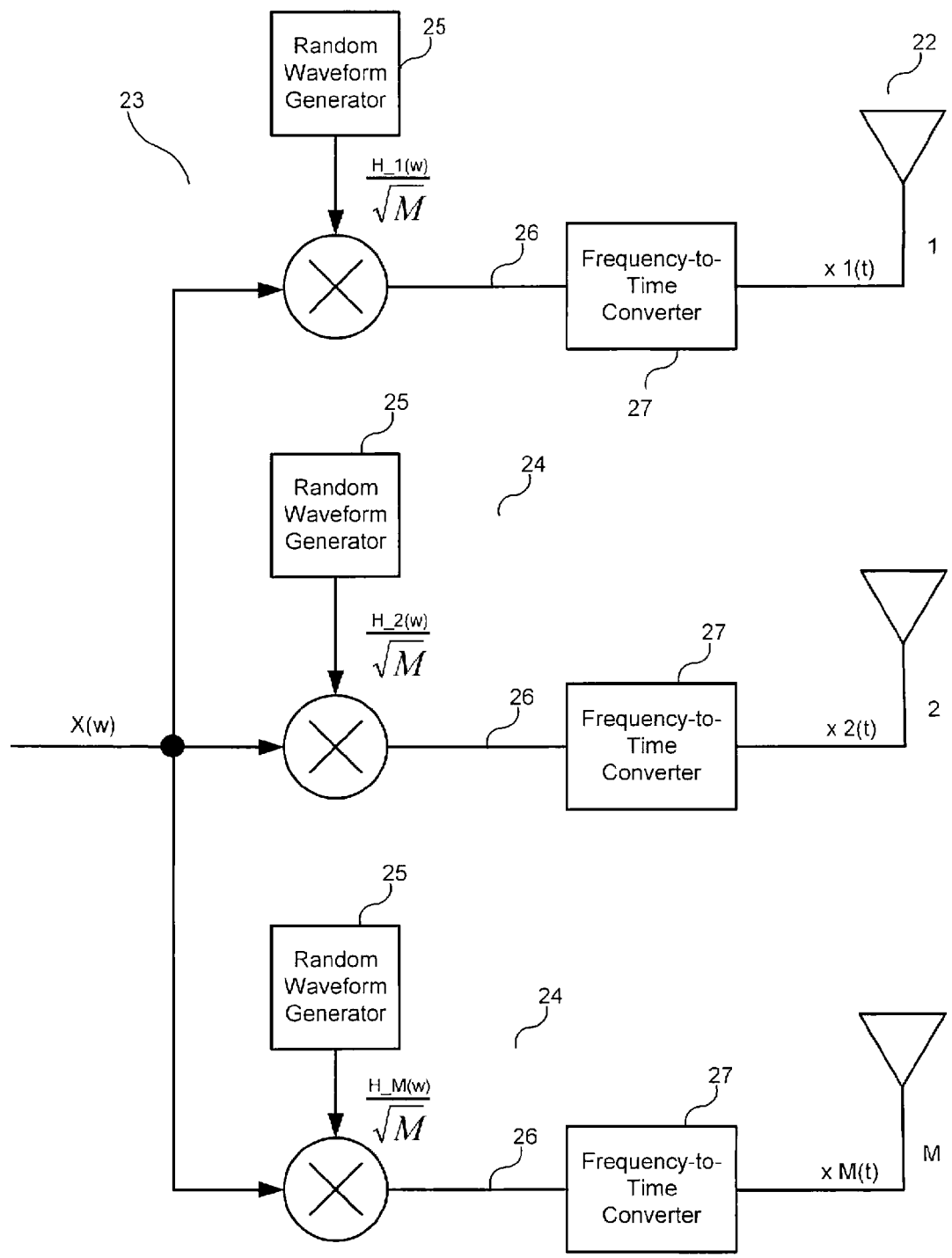
FIG. 2 illustrates a wireless communication apparatus according to further exemplary embodiments of the invention.

FIG. 2 diagrammatically illustrates a wireless communication apparatus that can implement principles illustrated by Equations 10-22 according to exemplary embodiments of the invention. In some embodiments, the apparatus of FIG. 2 is a cellular access point or base station. The access point of FIG. 2 includes a phased array of M antenna elements, designated generally at 22, and a drive arrangement designated generally at 23 that provides communication signaling to the antenna array 22. A signal X(w) for omni-directional transmission is input to each of M antenna transmission paths designated generally at 24 within the drive apparatus 23. The antenna transmission paths drive respectively corresponding ones of the M antenna elements. As shown, each antenna transmission path includes a signal combiner (e.g., a multiplier or amplifier) that combines (e.g., multiplies) the signal X(w) with the output of a respectively corresponding one of M random waveform generators.

The random waveform generators, designated generally at 25, produce respective output signals $$\frac{1}{\sqrt{M}}H_i(w) \text{ (for } i = 1, 2, \ldots M).$$

In some embodiments, for i≠j, $H_i(w)$ and $H_j(w)$ are independent but identically distributed random processes, each having a mean of zero and a variance of one. The signal multipliers combine the respective signals from the random waveform generators with the input signal X(w) to produce respective frequency domain signals designated generally at 26. The M antenna transmission paths respectively include frequency-to-time converters designated generally at 27. These converters use conventional techniques to convert the associated frequency domain signal at 26 into a corresponding transmit signal in the time domain. The resulting M time domain transmit signals, designated as x1(t), x2(t), ... xM(t), are provided for transmission by the respectively corresponding antenna elements. The apparatus of FIG. 2 implements principles of Equations 10-22, and achieves approximately omni-directional transmission of a time domain version of the frequency domain signal X(w).

Various embodiments of the invention use various symbol modulation schemes. In some embodiments that use Orthogonal Frequency Division Multiplexing (OFDM), the symbol that is modulated onto sub-carrier frequency $w_k$ is multiplied by $H_i(w_k)$. This requires just one multiply per OFDM sub-carrier.

Regarding the aforementioned coherence bandwidth Δ, this parameter depends on the delay spread of the channel, which in turn depends on the operating environment of the transmit apparatus. Environments with longer delay spreads have shorter coherence bandwidths, and environments with shorter delay spreads have longer coherence bandwidths. For example, in outdoor environments, the coherence bandwidth can range from around 200 KHz to around 1 MHz.

Although exemplary embodiments of the invention have been described above in detail, this does not limit the scope of the invention, which can be practiced in a variety of embodiments.

What is claimed is:

1. A communication apparatus, comprising:
   a diversity array of M antenna elements;
   a drive arrangement coupled to said diversity array for producing communication signaling based on a desired communication signal that is to be transmitted omni-directionally, said M antenna elements cooperable in response to said communication signaling to effect approximately omni-directional antenna transmission of said desired communication signal;
   wherein said drive arrangement includes M antenna paths respectively coupled to said M antenna elements, each of said M antenna paths comprising a signal combiner;

wherein each of said M signal combiners receive a common input signal that corresponds to said desired signal;

wherein each of said M signal combiners multiplies a predetermined amount of amplification with said corresponding common input signal, and wherein the predetermined amount of amplification is dependent on a number of said M antenna elements in said diversity array; and wherein the predetermined amount of amplification is $$\frac{1}{\sqrt{M}}.$$

2. The apparatus of claim 1, wherein said antenna elements transmit with approximately equal power during said approximately omni-directional antenna transmission.

3. The apparatus of claim 1, wherein each of said M signal combiners applies an amount of amplification to said common input signal that is approximately equal to an amount of amplification applied to said common input signal by each of a remainder of said M signal amplifiers.

4. The apparatus of claim 1, provided as a fixed-site apparatus.

5. A method of operating a diversity array of M antenna elements, comprising:

providing the diversity array of M antenna elements;

providing a drive arrangement coupled to said diversity array for producing communication signaling based on a desired communication signal that is to be transmitted omni-directionally using said diversity array, wherein said drive arrangement includes M antenna paths respectively coupled to said M antenna elements, each of said M antenna paths comprising a signal combiner, and wherein each of said M signal combiners receive a common input signal that corresponds to said desired signal; and using said communication signaling in combination with cooperation among said M antenna elements to effect approximately omni-directional antenna transmission of said desired communication signal by having each of said M signal combiners multiply a predetermined amount of amplification with said corresponding common input signal, and wherein the predetermined amount of amplification is dependent on a number of said M antenna elements in said diversity array; and wherein the predetermined amount of amplification is $$\frac{1}{\sqrt{M}}.$$

* * * * *